United States Patent Office 3,173,901
Patented Mar. 16, 1965

3,173,901
POLYMERIZATION PROCESS AND CATALYST THEREFOR
Raymond G. Newberg, Wyoming, and Franklyn D. Miller and Joseph Wagensommer, Cincinnati, Ohio, assignors to National Distillers and Chemical Corporation, New York, N.Y., a corporation of Virginia
No Drawing. Filed June 30, 1959, Ser. No. 823,805
12 Claims. (Cl. 260—88.2)

The present invention relates to a novel process for polymerizing ethylenically unsaturated hydrocarbons in the presence of a combination catalyst system to produce high molecular weight, normally solid polymers and, more particularly, to the polymerization of monoolefinic hydrocarbons in the presence of a novel combination catalyst system which includes a compound of an element of Group IVa of the periodic system.

This application is a continuation-in-part of application Serial No. 773,143, filed November 12, 1958, now abandoned.

In broad aspect, the invention is based on the discovery that, in the polymerization of an ethylenically unsaturated hydrocarbon with a combination catalyst composition comprising a suitable reducing agent, a compound of a Group IVb metal, and a compound of a Group Vb metal, marked and unexpected improvements are obtained in polymerizing such olefins by incorporating in said catalyst a compound of an element of Group IVa of the periodic chart of the elements, said group for the purpose of this invention consisting of silicon, germanium, tin and lead. More specifically, the present invention is based on the discovery that in the polymerization of a monoolefin, as for example ethylene, propylene, and other lower molecular weight monoolefins, substantial and unexpected increases in yield and rate of production of the desired polymer product can be attained if the combination catalyst contains a compound of an element of Group IVa of the periodic system, such as Group IVa metal halides, Group IVa metal organohalides, Group IVa metal aryl halides, Group IVa metal alkoxides, Group IVa metal alkylhalides, Group IVa metal alkyls, Group IVa metal aryls, etc. More specific examples include silicon tetrachloride, germanium tetrachloride, stannic chloride, lead chloride, ethyl silicate, amyltrichlorosilane, tetraethylsilane, tetrabutylgermane, tetraphenylgermane, dibutyltin dichloride, tetrabutyltin, tetraethyllead and the like, and mixtures thereof, as well as other mixed compounds such as diamyldiphenylgermanium, methylethylsilane, dibutyltin dimaleate, etc.

For practice of this invention, the combination catalyst comprises (1) a strong reducing agent, such as for example, an alkali metal (e.g., sodium), an alkaline earth metal (e.g., magnesium, calcium), an organoalkali compound (e.g., butylsodium), an organometallic compound (e.g., triethylaluminum), and the like, or mixtures thereof, with other examples including tripropylaluminum, triisobutylaluminum, tri-n-decylaluminum, butylmagnesium chloride, dibutylmagnesium, etc and (2) a co-catalyst component comprising a mixture of (a) a compound of a metal of Group IVb of the periodic system, particularly a halide-containing compound or an organic derivative thereof, and others, (b) a compound, such as a halide, an oxyhalide, or an organohalide of a metal of Group Vb of the periodic system, and (c) a compound of an element of Group IVa of the periodic system.

The compound of a Group IVb metal from the group consisting of titanium, zirconium, hafnium, and thorium is preferably a halide thereof, such for example, a chloride and illustrative of which are titanium tetrachloride and titanium trichloride. Still other halides include the bromides, iodides, and fluorides with specific illustrations thereof being zirconium tetrabromide, titanium tetraiodide, zirconium dibromide, hafnium triiodide, thorium tetrabromide, and the like. Further examples of compounds of such metals include those corresponding to a tetrahalide thereof in which from one to four of the halide atoms is replaced with an OR group in which R is a hydrocarbon group (e.g., alkyl). Illustrative thereof are compounds such as trichlorobutoxytitanium, dichloroethoxybutoxytitanium, dichlorodibutoxyzirconium, bromotriethoxyzirconium, and the like.

The Group Vb metal component is preferably vanadium oxychloride, but other halide-containing derivatives of such metals may be used, such as the bromides, iodides, and fluorides, their corresponding oxyhalides and organohalides. Mixtures thereof may be used, with specific examples including vanadium tetrachloride, tantalum pentachloride, columbium pentabromide, and the like.

The total quantity of the combination catalyst used for practice of this invention may be varied within a wide range, but generally is within the range of from about 0.005 to about one percent based on the weight of the unsaturated hydrocarbon subjected to polymerization. The proportional amounts of the individual components of the total combination catalysts may also be varied. For example, the mole percent of the reducing agent in the total catalyst may range from about 9 to about 98 mole percent, but preferably from about 23 to about 91 mole percent. The components of the co-catalyst may also be present in varying amounts, but generally in the range of from about 1 to 90, and preferably 20 to 90 mole percent of the Group IVb compound; from about 1 to 90, and preferably from about 1 to 65, mole percent of the Group Vb compound, and from about 1 to 90, and preferably 1 to 80, mole percent of the Group IVa compound, the total composition of the co-catalyst consisting essentially of about 100%.

Generally, the invention may be carried out with use of the combination catalyst in which the reducing agent is present in amounts such that the combination catalyst contains a mole ratio of from 0.1 to about 50 of the reducing agent per mole of the co-catalyst (i.e., the mixture of the Group IVb compound, Group Vb compound and Group IVa compound); and, more specifically, from about 0.3 to about 10 moles of the reducing agent per mole of the total co-catalyst. Thus, as an embodiment, using (1) a trialkylaluminum as the reducing agent and (2) a mixture of halides of a Group IVb metal, a Group Vb metal and a Group IVa metal as the co-catalyst, the combination catalyst embodied herein may comprise in mole ratio, from 0.1 to 50 moles of the trialkylaluminum per mole of the mixture of said halides, and, as aforesaid, more specifically, a mole ratio of 0.3 to about 10 of the aluminum trialkyl per mole of the mixture of said halides.

For effecting the desired polymerization of the polymerizable hydrocarbons, as embodied herein, a temperature from about room temperature to about 300° C. is generally employed, but preferably from about 120 to about 275° C. The polymerization may be effected at from substantially atmospheric pressure up to about 2000 atmospheres, but preferably an elevated pressure of from about 1500 to about 6000 p.s.i.g. is used. When the higher pressures are used such as from about 10,000 to about 30,000 p.s.i., the process can be carried out without use of a diluent or liquid reaction medium, as is customarily used in low pressure operations, thereby obviating the need for solvent recovery operations, etc. normally attendant to low pressure operations.

The compounds which may be polymerized according to the present invention consist generally of hydrocarbons, such as the olefins containing from 2 to 16 carbon atoms that are polymerizable when contacted with the aforedefined combination catalyst under polymerizing conditions of temperature and pressure. Specific examples of such polymerizable hydrocarbons include ethylene, propylene, butene-1, pentene-1, hexene-1, 4-methyl-pentene-1, butadiene, isoprene, styrene and methyl styrene, and the like. Mixtures of such polymerizable hydrocarbons as for example a mixture of ethylene and butene-1, may also be used for copolymerization with the catalyst system embodied herein.

The polymerization reaction is carried out either in batch, semi-continuous, or continuous operations. Most conveniently, and in the present embodiments, the process at lower pressure operations is carried out in a diluent or liquid reaction medium, the amount not being unduly critical, but it should be at least sufficient to permit effective agitation and preferably to hold the major portion of the polymer in solution. Organic solvents and/or diluents of the organic hydrocarbon class, such as pentane, heptane, isooctane, octane, cyclopentane, decalin, benzene, toluene, cyclohexane, decahydronaphthalene and mixtures of these materials may be used. It is preferred that the material used be essentially free of impurities which may react to destroy catalyst activity or which copolymerize with the olefinic hydrocarbon, that is, appreciable quantities of materials such as carbon dioxide, oxygen, and acetylenic compounds should preferably be absent.

For this process the polymerizable hydrocarbon may be used in substantially pure form or there may be used a mixture containing major quantities thereof, provided no impurities are present in substantial amounts to destroy the catalyst and/or contaminate the polymer products. For instance, ethylene obtained by the cracking of hydrocarbon streams is satisfactory if acetylenic and oxygenated materials are not present in more than trace amounts.

In carrying out the herein described polymerization process, it is preferable and highly desirable to maintain the polymerization zone free of extraneous gases. This can be done by keeping the reactor blanketed at all times with an inert gas, for example, operating with an inert gas such as nitrogen, argon, or helium. Preferably the reactor and its contents are blanketed with the polymerizable substance, e.g., ethylene gas, to avoid unnecessary dilution of the reactor contents with inert gases.

In order to further describe the invention, the following examples set forth results obtained by practice of several embodiments of this invention, as well as (for comparative purposes) results obtained with various other catalysts falling outside of the scope of this invention.

EXAMPLE 1

One hundred and sixty milliliters of decalin was placed in a 300 ml. baffled flask equipped with a high-speed stirrer and heated to 125° C. 0.0198 gram of triethylaluminum (0.173 millimole) and 0.0066 gram (0.037 millimole) of a mixture comprising 73.5 weight percent of vanadium oxychloride, 24.5 weight percent of titanium tetrachloride, and 2.0 weight percent of silicon tetrachloride were added, and ethylene was then introduced at a rate to maintain an ethylene pressure in the reactor of 60 mm. of mercury. The reaction was carried out, with stirring, at 125° C.±3° at pressures of 60 mm. of mercury. Rate data were obtained every minute in the beginning and every five minutes throughout the remainder of the experiment. After 20 minutes the amount of ethylene reacted to a normally solid polymer per hour per gram of catalyst was 424.5 grams.

EXAMPLE 2

One hundred and sixty milliliters of decalin was placed in a 300 ml. baffled flask equipped with a high-speed stirrer and heated to 125° C. 0.0132 gram (0.116 millimole) of triethylaluminum and 0.0066 gram (0.037 millimole) of a mixture comprising 73.5 weight percent of vanadium oxychloride, 24.5 weight percent of titanium tetrachloride, and 2.0 weight percent of silicon tetrachloride were added, and ethylene was then introduced at a rate to maintain an ethylene pressure in the reactor of 60 mm. of mercury. The reaction was carried out, with stirring, at 125° C.±3° at pressures of 60 mm. of mercury. Rate data were obtained every minute in the beginning and every five minutes throughout the remainder of the experiment. After 20 minutes the amount of ethylene reacted to a normally solid polymer per hour per gram of catalyst was 552.3 grams.

The advantages of this invention may be illustrated by the following comparative examples in which polymerization catalysts containing certain components, except the Group IVa compound, of the catalyst of Examples 1–2 were used. It should be noted that in the following comparative examples, none of which contained a Group IVa compound, the amount of ethylene reacted per hour ranged from 15 to 384 grams per gram of catalyst, whereas in Examples 1–2 illustrating the present invention, the amount of ethylene reacted per hour was between 424.5 and 552.3 grams per gram of catalyst.

EXAMPLE 3

One hundred and sixty milliliters of decalin was placed in a 300 ml. baffled flask equipped with a high-speed stirrer and heated to 125° C. 0.0053 gram (0.0465 millimole) of triethylaluminum and 0.0066 gram (0.034 millimole) of titanium tetrachloride were added, and ethylene was then introduced at a rate to maintain an ethylene pressure in the reactor of 60 mm. of mercury. The reaction was carried out, with stirring, at 125° C.±3° at a pressure of 60 mm. of mercury. Rate data were obtained every minute in the beginning and every five minutes throughout the remainder of the experiment. After 20 minutes the amount of ethylene reacted to a normally solid polymer per hour per gram of catalyst was 15 grams.

EXAMPLE 4

A reaction was carried out under the same conditions as Example 3, except that 0.0198 gram (0.174 millimole) of triethylaluminum was used and from which 97.8 grams of polymer per gram of catalyst was obtained.

EXAMPLE 5

One hundred and sixty milliliters of decalin was placed in a 300 ml. baffled flask equipped with a high-speed stirrer and heated to 125° C. 0.0066 gram of triethylaluminum (0.058 millimole) and 0.0066 gram (0.038 millimole) of vanadium oxychloride were added, and ethylene was then introduced at a rate to maintain an ethylene pressure in the reactor of 60 mm. of mercury. The reaction was carried out, with stirring, at 125° C.±3° at a pressure of 60 mm. of mercury. Rate data were obtained every minute in the beginning and every five minutes throughout the remainder of the experiment. After 20 minutes the amount of ethylene reacted to a normally solid polymer per hour per gram of catalyst was 222.6 grams.

EXAMPLE 6

One hundred and sixty milliliters of decalin was placed in a 300 ml. baffled flask equipped with a high-speed stirrer and heated to 125° C. 0.0066 gram (0.058 millimole) of triethylaluminum and 0.0066 gram (0.037 millimole) of a mixture comprising 76.5 mole percent of vanadium oxychloride and 23.5 mole percent of titanium tetrachloride were added, and ethylene was then introduced at a rate to maintain an ethylene pressure in the reactor of 60 mm. of mercury. The reaction was carried out, with stirring, at 125° C.±3° at a pressure of 60 mm. of mercury. Rate data were obtained every minute in the beginning and every five minutes throughout the remainder of the experiment. After 20 minutes the amount of ethylene reacted to a normally solid polymer per hour per gram of catalyst was 109.2 grams.

EXAMPLE 7

One hundred and sixty milliliters of decalin was placed in a 300 ml. baffled flask equipped with a high-speed stirrer and heated to 125° C. Triethylaluminum (0.0198 gram) and 0.0066 gram of a mixture comprising 75 wt. percent of vanadium oxychloride and 25.0 wt. percent of titanium tetrachloride were added, and ethylene was then introduced at a rate to maintain an ethylene pressure of 60 mm. of mercury in the reactor. The reaction was carried out, with stirring, at 125° C.±3° at pressures of 60 mm. of mercury. Rate data were obtained every minute in the beginning and every five minutes throughout the remainder of the experiment. After 20 minutes the amount of ethylene reacted (to a normally solid polymer) per hour per gram of catalyst was 384.0 grams.

EXAMPLE 8

One hundred and sixty ml. of decalin was placed in a 300 ml. baffled flask equipped with a high-speed stirrer and heated to 125° C. Triethylaluminum (0.0132 gram) (0.12 millimole) and 0.0066 gram (0.038 millimole) of a mixture comprising 75.0 wt. percent of vanadium oxychloride and 25 wt. percent of titaniumtetrachloride were added, and ethylene was then introduced at a rate to maintain an ethylene pressure of 60 mm. of mercury in the reactor. The reaction was carried out, with stirring, at 125° C.±3° at pressures of 60 mm. of mercury. Rate data were obtained every minute in the beginning and every five minutes throughout the remainder of the experiment. After 20 minutes the amount of ethylene reacted (to a normally solid polymer) per hour per gram of catalyst was 381.6 grams.

EXAMPLE 9

One hundred and sixty milliliters of decalin was placed in a 300 ml. baffled flask equipped with a high-speed stirrer and heated to 125° C. Triethylaluminum (0.0198 gram) and 0.0066 gram of vanadium oxychloride were added and ethylene introduced as in Example 1. The reaction was carried out, with stirring, at 125° C.±3° at pressures of 60 mm. of mercury. Rate data were obtained every minute in the beginning and every five minutes throughout the remainder of the experiment. After 20 minutes, the amount of ethylene reacted (to a normally solid polymer) per hour per gram of catalyst was 264.0 grams.

EXAMPLE 10

One hundred and sixty milliliters of decalin was placed in a 300 ml. baffled flask equipped with a high-speed stirrer and heated to 125° C. Triethylaluminum (0.0132 gram) and 0.0066 gram of vanadium oxytrichloride were added, and ethylene was then introduced as in Example 1. The reaction was carried out, with stirring, at 125° C.±3° at pressures of 60 mm. of mercury. Rate data were obtained every minute in the beginning and every five minutes throughout the remainder of the experiment. After 20 minutes the amount of ethylene reacted (to a normally solid polymer) per hour per gram of catalyst was 242.2 grams.

EXAMPLE 11

One hundred and sixty milliliters of decalin was placed in a 300 ml. baffled flask equipped with a high-speed stirrer and heated to 125° C. Triethylaluminum (0.0198 gram) and 0.0066 gram of titanium tetrachloride were added, and ethylene was then introduced as in Example 1. The reaction was carried out, with stirring, at 125° C.±3° at pressures of 60 mm. of mercury. Rate data were obtained every minute in the beginning and every five minutes throughout the remainder of the experiment. After 20 minutes the amount of ethylene reacted (to a normally solid polymer) per hour per gram of catalyst was 97.8 grams.

EXAMPLE 12

One hundred and sixty milliliters of decalin was placed in a 300 ml. baffled flask equipped with a high-speed stirrer and heated to 125° C. Triethylaluminum (0.0132 gram) and 0.0066 gram of titanium tetrachloride were added, and ethylene was then introduced as in Example 1. The reaction was carried out, with stirring, at 125° C.±3° at pressures of 60 mm. of mercury. Rate data were obtained every minute in the beginning and every five minutes throughout the remainder of the experiment. After 20 minutes the amount of ethylene reacted (to a normally solid polymer) per hour per gram of catalyst was 206.1 grams.

The following tabulation (Table I) sets forth in tabular form, for ease of comparison, the results obtained from the foregoing examples.

*Table I*

| Example | Total Catalyst | | | | | Grams of $C_2H_4$ polymerized per hour per gram of catalyst |
|---|---|---|---|---|---|---|
| | Reducing Agent (grams) $(C_2H_5)_3Al$ | Co-catalyst (grams) | | | | |
| | | $VOCl_3$ $TiCl_4$ $SiCl_4$ | $TiCl_4$ | $VOCl_3$ | $VOCl_3$ $TiCl_4$ | |
| 1 | 0.0198 | 0.0066 | | | | 424.5 |
| 2 | 0.0132 | 0.0066 | | | | 552.3 |
| Comparative Example: | | | | | | |
| 3 | 0.0053 | | 0.0066 | | | 15 |
| 4 | 0.0198 | | 0.0066 | | | 97.8 |
| 5 | 0.0066 | | | 0.0066 | | 222.6 |
| 6 | 0.0066 | | | | 0.0066 | 109.2 |
| 7 | 0.0198 | | | | 0.0066 | 384 |
| 8 | 0.0132 | | | | 0.0066 | 381.6 |
| 9 | 0.0198 | | | 0.0066 | | 264 |
| 10 | 0.0132 | | | 0.0066 | | 242 |
| 11 | 0.0198 | | 0.0066 | | | 97.8 |
| 12 | 0.0132 | | 0.0066 | | | 206.1 |

In the following Table II, the results set forth were obtained from additional runs carried out with still other catalyst compositions embodied for use herein under the procedures described for the foregoing examples.

The process of this invention, in addition to improving the rate of polymerization and yield of polymer, produces a superior polymer product. For example, polyethylene polymer (designated polymer X) prepared

*Table II*

| Example | Co-catalyst Composition | Co-catalyst Grams | Co-catalyst Millimoles | Triethylaluminum Grams | Triethylaluminum Millimoles | Grams of $C_2H_4$ polymerized per hour/gram of Catalyst (Total) |
|---|---|---|---|---|---|---|
| 13 | 3.0 wt. percent $C_5H_{11}SiCl_3$<br>48.5 wt. percent $VOCl_3$ | 0.0066 | 0.0362 | 0.0099 | 0.087 | 594.3 |
| 14 | 48.5 wt. percent $TiCl_4$ | 0.0066 | 0.0362 | 0.0066 | 0.058 | 348.0 |
| 15 | 4.0 wt. percent $SnCl_4$<br>48.0 wt. percent $VOCl_3$ | 0.0066 | 0.0360 | 0.0132 | 0.116 | 618.0 |
| 16 | 48.0 wt. percent $TiCl_4$ | 0.0066 | 0.0360 | 0.0099 | 0.087 | 583.0 |
| 17 | 4.0 wt. percent $(C_2H_5)_4Si$<br>48.0 wt. percent $VOCl_3$ | 0.0066 | 0.0360 | 0.0099 | 0.087 | 634.0 |
| 18 | 48.0 wt. percent $TiCl_4$ | 0.0066 | 0.0360 | 0.0132 | 0.116 | 624.0 |
| 19 | 4.0 wt. percent $GeCl_4$<br>48.0 wt. percent $VOCl_3$ | 0.0066 | 0.0362 | 0.0132 | 0.116 | 630.0 |
| 20 | 48.0 wt. percent $TiCl_4$ | 0.0066 | 0.0362 | 0.0198 | 0.174 | 514.0 |
| 21 | 4.0 wt. percent $PbCl_4$<br>48.0 wt. percent $VOCl_3$<br>48.0 wt. percent $TiCl_4$ | 0.0066 | 0.0357 | 0.0132 | 0.116 | 612.0 |
| 22 | 5.0 wt. percent $SiCl_4$<br>71.3 wt. percent $TiCl_4$<br>23.7 wt. percent $VOCl_3$ | 0.0066 | 0.0357 | 0.0132 | 0.116 | 472.0 |
| 23 | 4.0 wt. percent $SiCl_4$<br>48.0 wt. percent $VCl_4$<br>48.0 wt. percent $TiCl_4$ | 0.0066 | 0.0346 | 0.0099 | 0.087 | 603.0 |

EXAMPLE 24

In still another run, a copolymer was prepared by use of a procedure similar to that of the foregoing examples but at 230° C., 2500 p.s.i., a residence time of 15 minutes in the reactor and cyclohexane as the reaction medium. The feed was a mixed stream of ethylene containing 27% butene-1 and the catalyst system was composed of triethylaluminum and a co-catalyst of $VOCl_3$ (73.5%), $TiCl_4$ (24.5%) and $SiCl_4$ (2.0%) with the ratio of co-catalyst to triethylaluminum being 2.2 to 1 on a weight basis. One thousand grams of a copolymer was obtained from 1.8 grams of total catalyst, the copolymer having a density of 0.9472, a yield strength of 3230 p.s.i., and melt index of 0.72.

The following tabulation (Table III) sets forth numerous additional runs using, as the reducing agent, triisobutylaluminum and, as co-catalyst in accordance with this invention, mixtures of $TiCl_4$, $VOCl_3$ and $SiCl_4$ at a constant Al/Ti+V+Si mole ratio, while varying the proportional amounts of the co-catalyst components. Also included are comparable runs but in which at least one of the components of the co-catalyst was not present and, as shown, resulted in markedly reduced rate of polymerization as compared to the runs in which the catalyst combination of this invention was used.

in accordance with this invention at 200–250° C. and 2500 p.s.i. pressure was evaluated against several commercially available low pressure, high density polymers. Such a polymer (X) was prepared using a catalyst composed of one part by weight of triethylaluminum to 4.5 parts of a co-catalyst composed of $VOCl_3$ (65%), $TiCl_4$ (20%) and $SiCl_4$ (15%), the yield of polymer being 1000 lbs. per pound of total catalyst. Physical properties were compared directly with a commercially available low pressure, high density linear polyethylene (polymer A) made by polymerization with an activated, supported chromium oxide catalyst; another commercially available polymer (B) of the same type, but prepared by another manufacture; and a third commercially available linear material (C), prepared by use of the Ziegler type (i.e., triethylaluminum and titanium tetrachloride type) catalyst. All polymers had substantially the same melt index. When evaluated against such commercially available linear polymers of substantially the same melt index range, the polymer produced by practice of this invention possessed (1) better drawdown properties, (2) better heat resistance, (3) better stress crack resistance, (4) equivalent or superior elongation, (5) equivalent electrical properties, and (6) better gloss, less mold warpage, less shrinkage and higher film transparency.

*Table III*

| Example | $Al(i-C_4H_9)_3$, millimoles | Composition of metal halide mixture Total moles | $TiCl_4$, mole percent | $VOCl_3$, mole percent | $SiCl_4$, mole percent | Al/Total Metal Halide, Mole Ratio | Ethylene Absorbed, grams per gram of total catalyst per hour |
|---|---|---|---|---|---|---|---|
| 25 | 0.0334 | 0.0115 | 100 | 0 | 0 | 2.9 | 420 |
| 26 | 0.0325 | 0.0125 | 0 | 100 | 0 | 2.6 | 570 |
| 27 | 0.0333 | 0.0119 | 73.3 | 24.7 | 0 | 2.8 | 770 |
| 28 | 0.0333 | 0.0119 | 72.9 | 0 | 27.1 | 2.8 | 564 |
| 29 | 0.0340 | 0.0130 | 0 | 24.6 | 75.4 | 2.6 | 383 |
| 30 | 0.0336 | 0.0120 | 60 | 35.4 | 4.6 | 2.8 | 1,130 |
| 31 | 0.0340 | 0.0121 | 54.7 | 29.3 | 16.0 | 2.8 | 1,450 |
| 32 | 0.0330 | 0.0122 | 47.4 | 20.8 | 31.8 | 2.7 | 1,300 |
| 33 | 0.0330 | 0.0122 | 47.4 | 10.4 | 42.2 | 2.7 | 945 |
| 34 | 0.0330 | 0.0122 | 42.5 | 15.5 | 42.0 | 2.7 | 1,230 |
| 35 | 0.0336 | 0.0120 | 67.8 | 10.6 | 21.6 | 2.8 | 1,260 |
| 36 | 0.0333 | 0.0119 | 73.0 | 5.3 | 21.7 | 2.8 | 956 |
| 37 | 0.0333 | 0.0119 | 72.9 | 3.2 | 23.9 | 2.8 | 975 |

Polymerization temperature=125° C. Ethylene pressure=60 mm. Hg (gauge). Ethylene=deoxidized over reduced copper oxide. Solvent=160 ml. decalin.

For making the evaluatioin, test specimens of the resins were milled for 10 minutes on a 6" x 13" 2 roll mill, sheeted off and molded into sheets .050, .075" and .125" thick for evaluation of physical and electrical properties. Mill temperatures were 290° F. front roll and 300° rear roll. A three minute warm-up period in contact with the heated rolls preceded the milling.

*Rheological properties and special studies.*—In order to characterize the molecular weight distribution and melt fracture properties of the resins, some of the rheological properties were determined. The CIL grader flow properties were studied and rheology constants determined. Other special studies performed included the measurement of infrared absorption, crystalline melting point and intrinsic viscosity.

The physical properties, as determined, are set forth in Table IV; the rheological properties are set forth in Table V and infrared absorption data in Table VI.

As shown, the polymer (X) has better resistance to deformation under load, and elongation properties are equivalent to or better than the commercial resins. In reference to elongation, the samples were pulled at a crosshead speed of 2"/minute. At this speed, the elongation of polymer X of this invention exceeded the machine limits whereas polymer C broke at an elongation of 816%.

As is also shown, stress crack resistance of the polymer (X) of this invention is much superior to that of the commercial A and B polymers. In a standard test, the polymer of this invention did not fail at 48 hours exposure while the A and B polymer attained 28 and 26.5 hours, respectively. Since poor stress crack resistance is a serious failing of many linear polymers, it is evident that the polymers produced in accordance with this invention are markedly superior in that respect.

The infrared absorption of 6.1$\mu$ clearly shows greater unsaturation present in the A and B polymers and essentially all of the unsaturation is present as vinyl unsaturation as shown by the high absorption at 10.1 and 11.03$\mu$. The polymer (X) of this invention, containing less total unsaturation, results in better aging properties, shows a wider variety with comparatively more trans-internal (10.4$\mu$) and vinylidene (11.25$\mu$) and less vinyl unsaturation.

cordance with this invention is its superior drawdown properties in comparison to the commercial resins. This material could be processed at the maximum machine rate of 53 feet per minute (f.p.m.) but the web of the competitive resins broke at speeds over 35 f.p.m. Varying the processing temperatures on this extruder failed to improve the drawdown of the A and B resins.

The films obtained from the aforesaid resins show that the polymer from practice of this invention possesses good elongation and toughness (Table VII) and improved gloss and haze properties over the commercial resins.

*TABLE IV.—Physical properties*

| Property | Units | Polymer X | Commercially Available Polymer | | |
|---|---|---|---|---|---|
| | | | A | B | C |
| Density | Gm./cm.³ | 0.9535 | 0.9650 | .9632 | 0.9515 |
| Melt Index | Gm./10 min. | 0.78 | 0.76 | 0.79 | 0.71 |
| Yield Point | P.s.i | 3790 | 4,732 | 4,421 | 3,458 |
| Elongation | Percent | ¹>900 | 900 | 900 | 816 |
| Ultimate Tensile Strength | P.s.i | >4259 | 2,299 | 3,257 | 2,095 |
| Torsional Stiffness | P.s.i | 222,688 | 202,488 | 279,616 | |
| Deformation Under Load | Percent | 0.29 | 0.74 | | |
| Low Temperature Brittleness | °F | <−76 | <−76 | <−76 | |
| Stress Crack, F₅₀ | Hrs | >48 hrs. | 28 | 26.5 | |

¹ No break.

*TABLE V.—Rheological properties*

| | | | | |
|---|---|---|---|---|
| Melting Point | °C | 135 | 136 | |
| Activation Energy | K cal./mole | 6.1 | 7.5 | 6.7 |
| Pressure Constant | | 1.35 | 1.85 | 1.74 |
| Intrinsic Viscosity | | 2.099 | 2.011 | 1.805 |

*TABLE VI.—Infrared absorption*

| Wave Length, Microns | 6.15 | 7.25 | 10.12 | 10.42 | 11.03 | 11.25 |
|---|---|---|---|---|---|---|
| Polymer X | 5.0 | 18.6 | 1.24 | 1.18 | 14.4 | 2.1 |
| Polymer A | 9.9 | 10.2 | 9.0 | 0.5 | .30 | 2.1 |
| | 9.2 | | 8.4 | 0.9 | .34 | 0.9 |
| Polymer B | 10.3 | | 10.1 | 0.5 | .39 | 1.6 |

*TABLE VII.—Flat film properties*

| | Yield, p.s.i. | | Elongation, percent | | Break, p.s.i. | | Haze | Gloss |
|---|---|---|---|---|---|---|---|---|
| | MD¹ | TD² | MD¹ | TD² | MD¹ | TD² | | |
| Polymer A | 2,608 | 2,331 | 424 | 655 | 5,809 | 2,452 | 65.8 | 1.41 |
| Polymer B | 2,660 | 2,488 | 428 | >800 | 6,131 | >4,000 | 58.8 | 1.44 |
| Polymer X | 1,924 | 2,470 | 575 | 746 | 6,295 | 6,183 | 16.2 | 3.33 |

¹ MD—Machine Direction.
² TD—Transverse Direction.

The melting points were determined using a polarizing microscope with a hot stage and a maximum heating rate of 10° C. per minute above 120° C. The melting points were taken after a preliminary heating of the sample so that the disappearance of sperulites was recorded and not of birefringence caused by orientation which might not be relaxed at the melting temperature.

Pressure constant is proportional to molecular weight distribution, showing that polymer A had a broader distribution than polymer B with the polymer of this invention having the narrowest distribution.

A significant property of the polymer produced in ac-

In order to further describe the invention, its applicability to operations carried out at exceptionally high pressure is illustrated by the following embodiments in which ethylene was polymerized using as the catalyst, triethylaluminum as the reducing agent and, as the co-catalyst a mixture of $TiCl_4$, $VOCl_3$, $SnCl_4$ and $SiCl_4$ comprising in weight percents, 74, 24, 1.0 and 1.0, respectively. Each component was dissolved in cyclohexane whereby the co-catalyst solution had a total solids content of 11.4%, and the triethylaluminum was a 16% by weight solution. The two solutions were mixed to form the catalyst. A summary of those runs is shown in the following Table VIII.

of silicon tetrachloride, silicon amyl trichloride, tin tetrachloride, tetraethyl silicon, germanium tetrachloride and

*Table VIII*

| Example | Pressure, p.s.i.g. | Temperature, °F. | Catalyst Rate, lbs./hour TEA | Catalyst Rate, lbs./hour Co-catalyst | TEA/Co-catalyst (wt.) | Conversion, percent of feed | Product Rate, lbs./hr. | Density of Product, gm./cc. | Melt Index of Product |
|---|---|---|---|---|---|---|---|---|---|
| 38 | 19,000 | 440–500 | 0.0038 | 0.011 | 0.35 | 13.5 | 19.4 | 0.958 | 0.48 |
| 39 | 15,000 | 455–490 | 0.0078 | 0.021 | 0.37 | 7.5 | 17.0 | 0.952 | 0.32 |
| 40 | 15,000 | 460–490 | 0.009 | 0.012 | 0.74 | 12.5 | 7.6 | 0.930 | 0.05 |

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A polymerization process which comprises contacting an ethylenically unsaturated hydrocarbon of from 2 to 16 carbon atoms with a catalytic amount of a combination polymerization catalyst consisting of (1) a trialkylaluminum reducing agent, (2) a chloride of a Group IVb metal, (3) a compound of a Group Vb metal selected from the group consisting of Group Vb metal oxyhalides and Group Vb metal halides, and (4) a Group IVa metal compound selected from the group consisting of Group IVa metal halides, Group IVa metal alkyls, Group IVa metal aryls, Group IVa metal alkyl halides and Group IVa mixed aryl alkyls to produce a normally solid polymer of said hydrocarbon, a said Group IVa metal being from the group consisting of silicon, germanium, tin and lead and said combination catalyst being characterized by comprising from about 9 to about 98 mole percent of the trialkylaluminum reducing agent and the remainder, in a ratio of mole percent, of from about 1 to about 90 of each of said Group IVb metal chloride, Group Vb compound and Group IVa compound.

2. A process, as defined in claim 1, wherein the ethylenically unsaturated hydrocarbon is a lower molecular weight aliphatic monoolefin.

3. A process, as defined in claim 2, wherein the monoolefin is ethylene.

4. A process, as defined in claim 1, wherein the ethylenically unsaturated hydrocarbon is contacted with the catalyst at a temperature of from about 120° to about 275° C. and at a pressure of from about 1500 to about 6000 p.s.i.g.

5. A process which comprises contacting an ethylenically unsaturated hydrocarbon of from 2 to 16 carbon atoms with from about 0.005 to about 1 percent, based on the weight of said unsaturated hydrocarbon, of a combination catalyst consisting essentially of from about 23 to about 91 mole percent of a trialkylaluminum reducing agent and the remainder of the catalyst comprising, in mole percent, from about 20 to about 90 percent of (1) a chloride of a Group IVb metal, from about 1 to about 65 percent of (2) a compound of a Group Vb metal selected from the group consisting of Group Vb metal oxyhalides and Group Vb metal halides, and from about 1 to about 80 percent of (3) a Group IVa metal compound selected from a group consisting of Group IVa metal halides, Group IVa metal alkyl halides, Group IVa metal alkyls, Group IVa metal aryls, and Group IVa mixed aryl alkyls to produce a normally solid polymer of said hydrocarbon, said Group IVa metal being from the group consisting of silicon germanium, tin and lead.

6. A process, as defined in claim 5, wherein the reducing agent is triethylaluminum, the Group Vb metal compound is selected from the group consisting of vanadium oxytrichloride and vanadium tetrachloride, the Group IVa metal compound is selected from the group consisting of silicon tetrachloride, silicon amyl trichloride, tin tetrachloride, tetraethyl silicon, germanium tetrachloride and lead tetrachloride, and the Group IVb metal chloride is titanium tetrachloride.

7. A process, as defined in claim 5, wherein the ethylenically unsaturated hydrocarbon is in mixture with another lower molecular weight ethylenically unsaturated hydrocarbon thereby producing a normally solid copolymer.

8. A process, as defined in claim 7, wherein the mixture of ethylenically unsaturated hydrocarbons is a mixture of ethylene and butene.

9. A combination catalyst, adapted for catalyzing the polymerization of an ethylenically unsaturated hydrocarbon, consisting essentially of (1) a trialkylaluminum reducing agent, (2) a chloride of a Group IVb metal, (3) a compound of a Group Vb metal selected from the group consisting of Group Vb metal oxyhalides and Group Vb metal halides, and (4) a Group IVa metal compound selected from the group consisting of Group IVa metal halides, Group IVa metal alkyl halides, Group IVa metal alkyls, Group IVa metal aryls and Group IVa mixed aryl alkyls, said Group IVa metal being selected from the group consisting of silicon, germanium, tin and lead and said combination catalyst being characterized by comprising from about 9 to 98 mole percent of the reducing agent and the remainder, in a ratio of mole percent, of from about 1 to 90 of each of said Group IVb metal chloride, Group Vb compound and Group IVa compound.

10. A combination catalyst, as defined in claim 9, wherein the reducing agent is triethylaluminum, the Group Vb metal compound is selected from the group consisting of vanadium oxytrichloride and vanadium tetrachloride, the Group IVa metal compound is selected from the group consisting of silicon tetrachloride, silicon amyl trichloride, tin tetrachloride, tetraethyl silicon, germanium tetrachloride and lead tetrachloride, and the Group IVb metal chloride is titanium tetrachloride.

11. A combination catalyst, as defined in claim 9, wherein the reducing agent comprises from about 23 to 91 mole percent of the total combination catalyst, and the remainder of the combination catalyst comprises from about 20 to 90 mole percent of the Group IVb metal chloride, from about 1 to 65 mole percent of the Group Vb compound, and from about 1 to 80 mole percent of the Group IVa compound.

12. A combination catalyst, as defined in claim 11, wherein the reducing agent is triethylaluminum, the Group IVb metal chloride is titanium tetrachloride, the Group Vb compound is vanadium oxytrichloride and the Group IVa compound is silicon tetrachloride.

References Cited in the file of this patent

UNITED STATES PATENTS

| 2,786,036 | Freimiller et al. | Mar. 19, 1957 |
| 2,898,327 | McCullogh et al. | Aug. 4, 1959 |
| 2,899,413 | Hagemeyer et al. | Aug. 11, 1959 |
| 2,905,646 | Natta et al. | Sept. 22, 1959 |
| 2,920,062 | McFarland | Jan. 5, 1960 |
| 2,930,785 | Edmonds | Mar. 29, 1960 |

FOREIGN PATENTS

| 218,210 | Australia | Nov. 3, 1958 |
| 565,939 | Belgium | Sept. 22, 1958 |
| 1,154,219 | France | Oct. 28, 1957 |